United States Patent [19]

Noda et al.

[11] 4,073,677

[45] Feb. 14, 1978

[54] REVERSIBLY ROTATED WIPER IN AN EVAPORATOR

[75] Inventors: Yasuo Noda, Amagasaki; Takaya Inoue, Takatsuki, both of Japan

[73] Assignee: Kansai Kagaku Kikai Seisaku Kabushiki Kaisha, Japan

[21] Appl. No.: 723,450

[22] Filed: Sept. 15, 1976

[30] Foreign Application Priority Data

Sept. 26, 1975 Japan .............................. 50-115537

[51] Int. Cl.$^2$ .............................................. B01D 1/22
[52] U.S. Cl. ............................ 159/6 W; 159/DIG. 13; 15/246.5; 159/13 A
[58] Field of Search ......... 15/246.5; 159/6 W, 6 WH, 159/DIG. 13, 5, 13

[56] References Cited

U.S. PATENT DOCUMENTS

| 2,542,269 | 2/1951 | Zahm | 159/6 W |
|---|---|---|---|
| 2,672,404 | 3/1954 | Schultz | 159/6 W |
| 2,746,535 | 5/1956 | Barroso | 159/DIG. 13 |
| 2,831,665 | 4/1958 | Baerfuss | 159/6 W |
| 3,225,817 | 12/1965 | Thier | 159/6 W |
| 3,266,555 | 8/1966 | Thier | 159/6 WH |
| 3,395,419 | 8/1968 | Nunlist et al. | 15/246.5 |

FOREIGN PATENT DOCUMENTS

| 823,586 | 9/1969 | Canada | 159/6 WH |
|---|---|---|---|
| 1,177,621 | 9/1964 | Germany | 159/6 W |

*Primary Examiner*—Norman Yudkoff
*Attorney, Agent, or Firm*—Burgess, Ryan and Wayne

[57] ABSTRACT

A thin-film evaporator comprises a substantially cylindrical heating wall, a rotating shaft disposed coaxially with respect to said heating wall, a reversible motor connected to said shaft for driving it in opposite directions, blade means on said rotating shaft for applying liquid to be evaporated to said heating wall to form a thin film thereon during rotation of said shaft in one direction and scraping means on said shaft for scraping possible scales off said heating wall during rotation of said shaft in the other direction.

6 Claims, 3 Drawing Figures

REVERSIBLY ROTATED WIPER IN AN EVAPORATOR

The present invention relates to an evaporator of the type that high efficiency of evaporation can be obtained by applying liquid to be evaporated to the cylindrical inner wall of a heating tube in the form of a thin film by a blade-shaped applying means on a rotating shaft.

In an evaporator of said type, heat conductivity can be lowered by the deposition of scales on the inner wall of the heating tube when liquid to be evaporated tends to crystalize or solidify. In the worst case, the blade-shaped applying means will be destroyed by the scales on the heating tube. In order to avoid this case, the evaporator must be periodically stopped to effect cumbersome cleaning operation.

It is an object of the present invention to provide a thin-film evaporator with a novel device which can readily remove possible scales deposited on the inner wall of a heating tube.

A specific embodiment in accordance with the present invention will now be described by way of example with reference to the accompanying drawings in which.

Figure 1:
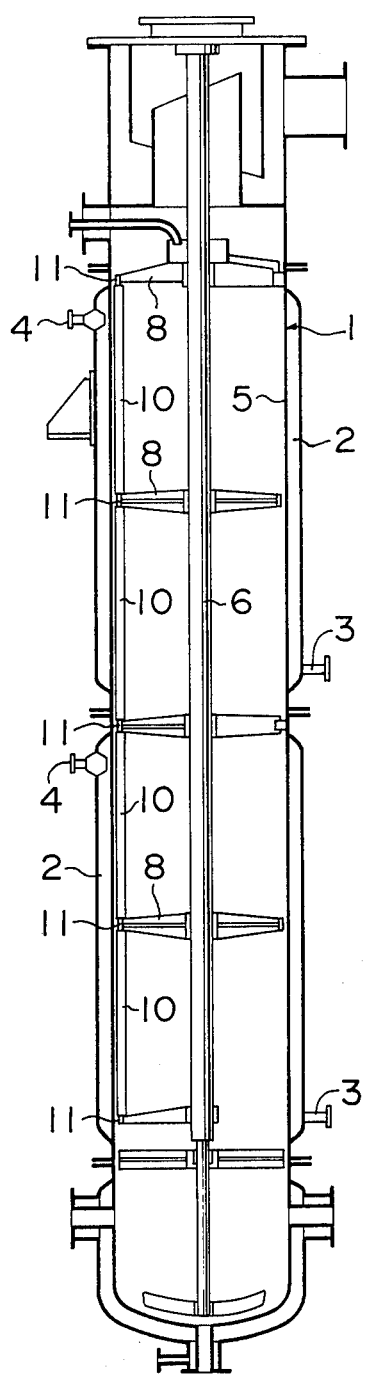
FIG. 1 is a schematic view showing in longitudinal section a thin-film evaporator provided with a tube cleaning device according to the present invention.

Referring to FIG. 1, a thin-film evaporator consists of a heating tube 1 having its outer periphery surrounded by jackets 2. Each of the jackets 2 has an entrance pipe 3 through which a fluid with high temperature is fed into the jacket 2 and an exit 4 through which the fluid is discharged from the jacket.

The heating tube 1 has a cylindrical inner wall 5 which is heated by the hot fluid within the jackets 2. A rotatable shaft 6 is located coaxially in respect to the inner wall 5 within the heating tube 1. The shaft 6 is connected with a reversible motor (not shown) for rotating it in opposite directions.

On the rotatable shaft 6 is mounted blade means (not shown) for applying liquid to be evaporated to the inner wall 5 to form a thin film thereon. The blade means may include blade members extending from the rotatable shaft 6 toward the inner wall 5 to apply liquid to be evaporated directly to the inner wall 5, or nozzle members for blowing liquid to be evaporated against the inner wall 5 under a centrifugal action during rotation of the shaft 6.

Since the above structure of the thin-film evaporator is well known by those skilled in the art, it is considered that it is not necessary to explain in more detail with respect to this structure.

In accordance with the present invention, a plurality of radial arms 8 are located on the rotatable shaft 6, these arms being spaced angularly from the blade members (not shown) and separated away from each other along the length of the shaft 6.

Holders 10 are located rotatably between the adjoining arms 8 adjacent to the inner wall 5 of the heating tube 1. These holders 10 can be rotated about an axis parallel to the inner wall 5.

Figure 2:
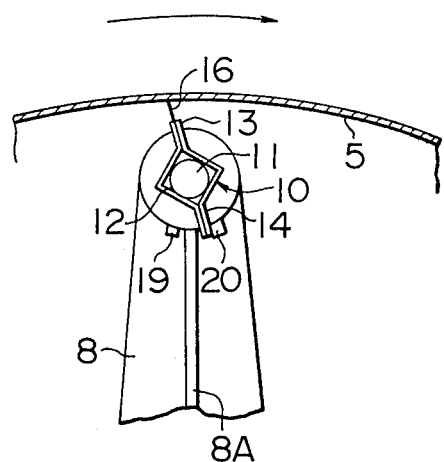
FIG. 2 is an enlarged fragmentary view showing partially in section a brush contacted with the inner wall of a heating tube during rotation in one direction.
Figure 3:
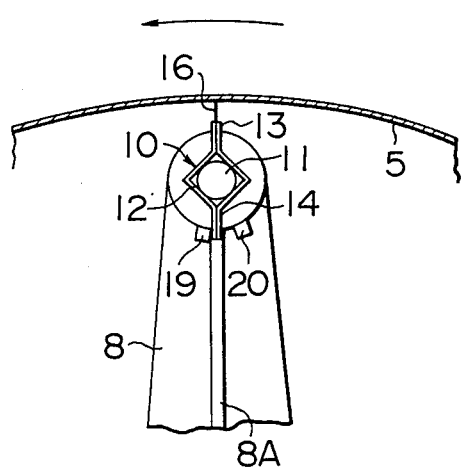
FIG. 3 is a view similar to FIG. 2 showing a contacting relationship between the brush and the inner wall of the heating tube during rotation in the other direction.

Each of the holders 10 includes a square portion 12 fitted on a bearing 11 extending from the tip of the arm 8 in a direction parallel to the inner wall 5 of the heating tube 1 and a pair of protruding portions 13 and 14 extending diagonally and outwardly from the square portion 12, as seen in FIGS. 2 and 3. The outer one of said protruding portions 13 holds a resilient rubbing member 16 such as a brush which extends longitudinally along the length of the holder 10 and contacts with the inner wall 5 of the heating tube 1. The inner protruding portion 14 is positioned between a pair of stoppers 19 and 20 on the arm 8 with its angular movement limited by these stoppers. One of the paired stoppers 19 is located at a position close to the longitudinal axis 8A of the arm 8 whereas the other stopper 20 is spaced away from the longitudinal axis 8A a distance larger than that between the stopper 19 and the longitudinal axis 8A.

When the shaft 6, and thus the arms 8 are rotated by the motor (not shown) in one direction as shown by an arrow in FIG. 2, the holder 10 is rotated counterclockwise under a frictional action between the resilient brush 16 and the inner wall 5 with the protruding portion 14 thereof brought into engagement with the stopper 20. At this position of the holder 10, the brush 16 is held under a condition out of alignment with the longitudinal axis 8A of the arm 8 and therefore engaged by the inner wall 5 with slight pressure to accomplish substantially no scraping action.

When the arms 8 are rotated in the other direction as shown by arrow in FIG. 3, the holder 10 is rotated clockwise with the protruding portion 14 thereof brought into engagement with the other stopper 19. Further rotation of the holder 10 is prevented by the stopper 19 so that the brush 16 is positioned at a position in alignment with the axis 8A of the arm 8 and engaged by the inner wall 5 with larger pressure to scrape possible scales off the inner wall 5 of the heating tube 1. This is because in the position of FIG. 3 the protruding portion 13 of the holder 10 is positioned closer to the inner wall 5 as compared with another position shown in FIG. 2. During this operation, the liquid to be evaporated may be applied to the tube wall through the applicator.

It is apparent from the foregoing that the resilient scraping member, that is the brush 16 is abutted against the inner wall 5 of the heating tube 1 with only slight pressure without preventing the evaporating operation during rotation in one direction shown in FIG. 2 while the brush 16 is engaged by the inner wall 5 with larger pressure to scrape the scales therefrom merely by reversing the direction of rotation of the shaft 6.

Although a preferred embodiment of the present invention has been described with reference to the accompanying, it should be understood that many changes or modifications may be accomplished by those skilled in the art without departing from the spirit and scope of the invention as claimed in appended claims.

We claim:

1. A thin-film evaporator comprising a substantially cylindrical heating wall, a rotating shaft disposed coaxially with respect to said heating wall, a reversible motor connected to said shaft for rotating it in opposite directions, blade means mounted on said rotating shaft for applying liquid to be evaporated to said heating wall to form a thin film thereon when said shaft is rotated by said motor in one direction and scraping means on said rotating shaft for scraping possible scales off said heating wall, said scraping means being adapted to rub against said heating wall with slight contact pressure when said shaft is rotated in said one direction and on the other hand to engage with said heating wall with larger pressure when said shaft is rotated in the other direction whereby the scales on the heating wall are scraped off therefrom.

2. A thin-film evaporator as claimed in claim 1 wherein said scraping means includes at least two arms extending radially from said rotating shaft to locations near the heating wall and spaced away from each other along the length of said shaft, holder means disposed between said arms and mounted rotatably thereon with its axis of rotation being parallel to the axis of said rotating shaft, resilient rubbing means held by said holder means for contacting with said heating wall and stopper means for positioning said holder means in a position in which said rubbing means is contacted with said heating wall with slight pressure to accomplish no scraping action when said shaft is rotated in said one direction and to position said holding means in another position in which said rubbing means is engaged by said heating wall with larger pressure to scrape the scales therefrom when the direction of rotation is reversed.

3. A thin-film evaporator as claimed in claim 2 wherein said stopper means includes a pair of stoppers which are located on at least one of said arms and spaced away from each other, said holder means being adapted to abut against said stoppers during rotation of said shaft in the opposite directions so that they will be positioned in said two positions.

4. A thin-film evaporator as claimed in claim 3, wherein one of said stoppers is located such that said rubbing means will lie off the longitudinal axis of said arms when said shaft is rotated in said one direction and the other of said stoppers is located such that said rubbing means will lie along the axis of said arm when said shaft is rotated in said other direction.

5. A thin-film evaporator as claimed in claim 4, wherein said rubbing means is a brush.

6. A thin-film evaporator as claimed in claim 4, wherein said holder means comprises a central body portion which is square in cross section and a pair of arms extending diagonally outwardly from said body portion, said rubbing means being mounted in one of said outwardly extending arms, the other of said outwardly extending arms being located between said stoppers to abut against one of the same according to the direction of movement of said shaft.

* * * * *